(12) United States Patent
Malina

(10) Patent No.: US 9,257,143 B1
(45) Date of Patent: Feb. 9, 2016

(54) PRECAUTIONARY MEASURES FOR DATA STORAGE DEVICE ENVIRONMENTAL CONDITIONS

(71) Applicant: Western Digital Technologies, Inc., Irvine, CA (US)

(72) Inventor: James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/582,091

(22) Filed: Dec. 23, 2014

(51) Int. Cl.
*G11B 27/36* (2006.01)
*G11B 19/04* (2006.01)

(52) U.S. Cl.
CPC .............. *G11B 19/04* (2013.01); *G11B 19/046* (2013.01); *G11B 27/36* (2013.01)

(58) Field of Classification Search
CPC .... G11B 27/36; G11B 5/012; G11B 2220/20; G11B 5/6005; G11B 5/09; G11B 5/59633
USPC .............................. 360/31, 75, 53, 60, 25, 46
See application file for complete search history.

(56) References Cited

U.S. PATENT DOCUMENTS

| | | | |
|---|---|---|---|
| 5,333,138 A | 7/1994 | Richards et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |

(Continued)

OTHER PUBLICATIONS

James N. Malina, U.S. Appl. No. 13/330,156, filed Dec. 19, 2011, 43 pages.

(Continued)

*Primary Examiner* — Nabil Hindi

(57) ABSTRACT

In preparing to send a write command to store data in at least one Data Storage Device (DSD), a request is sent to the at least one DSD to request environmental information indicating an environmental condition of the at least one DSD. The environmental information is received from the at least one DSD and it is determined whether the environmental information is within a threshold. The write command is sent to the at least one DSD if the environmental information is within the threshold and a precautionary measure is performed if the environmental information is not within the threshold.

32 Claims, 8 Drawing Sheets

(56) References Cited

U.S. PATENT DOCUMENTS

| | | | |
|---|---|---|---|
| 6,279,089 | B1 | 8/2001 | Schibilla et al. |
| 6,289,484 | B1 | 9/2001 | Rothberg et al. |
| 6,292,912 | B1 | 9/2001 | Cloke et al. |
| 6,310,740 | B1 | 10/2001 | Dunbar et al. |
| 6,317,850 | B1 | 11/2001 | Rothberg |
| 6,327,106 | B1 | 12/2001 | Rothberg |
| 6,337,778 | B1 | 1/2002 | Gagne |
| 6,369,969 | B1 | 4/2002 | Christiansen et al. |
| 6,384,999 | B1 | 5/2002 | Schibilla |
| 6,388,833 | B1 | 5/2002 | Golowka et al. |
| 6,405,342 | B1 | 6/2002 | Lee |
| 6,408,357 | B1 | 6/2002 | Hanmann et al. |
| 6,408,406 | B1 | 6/2002 | Parris |
| 6,411,452 | B1 | 6/2002 | Cloke |
| 6,411,458 | B1 | 6/2002 | Billings et al. |
| 6,412,083 | B1 | 6/2002 | Rothberg et al. |
| 6,415,349 | B1 | 7/2002 | Hull et al. |
| 6,425,128 | B1 | 7/2002 | Krapf et al. |
| 6,441,981 | B1 | 8/2002 | Cloke et al. |
| 6,442,328 | B1 | 8/2002 | Elliott et al. |
| 6,445,524 | B1 | 9/2002 | Nazarian et al. |
| 6,449,767 | B1 | 9/2002 | Krapf et al. |
| 6,453,115 | B1 | 9/2002 | Boyle |
| 6,470,420 | B1 | 10/2002 | Hospodor |
| 6,480,020 | B1 | 11/2002 | Jung et al. |
| 6,480,349 | B1 | 11/2002 | Kim et al. |
| 6,480,932 | B1 | 11/2002 | Vallis et al. |
| 6,483,986 | B1 | 11/2002 | Krapf |
| 6,487,032 | B1 | 11/2002 | Cloke et al. |
| 6,490,635 | B1 | 12/2002 | Holmes |
| 6,493,173 | B1 | 12/2002 | Kim et al. |
| 6,499,083 | B1 | 12/2002 | Hamlin |
| 6,519,104 | B1 | 2/2003 | Cloke et al. |
| 6,525,892 | B1 | 2/2003 | Dunbar et al. |
| 6,545,830 | B1 | 4/2003 | Briggs et al. |
| 6,546,489 | B1 | 4/2003 | Frank, Jr. et al. |
| 6,550,021 | B1 | 4/2003 | Dalphy et al. |
| 6,552,880 | B1 | 4/2003 | Dunbar et al. |
| 6,553,457 | B1 | 4/2003 | Wilkins et al. |
| 6,578,106 | B1 | 6/2003 | Price |
| 6,580,573 | B1 | 6/2003 | Hull et al. |
| 6,594,183 | B1 | 7/2003 | Lofgren et al. |
| 6,600,620 | B1 | 7/2003 | Krounbi et al. |
| 6,601,137 | B1 | 7/2003 | Castro et al. |
| 6,603,622 | B1 | 8/2003 | Christiansen et al. |
| 6,603,625 | B1 | 8/2003 | Hospodor et al. |
| 6,604,220 | B1 | 8/2003 | Lee |
| 6,606,682 | B1 | 8/2003 | Dang et al. |
| 6,606,714 | B1 | 8/2003 | Thelin |
| 6,606,717 | B1 | 8/2003 | Yu et al. |
| 6,611,393 | B1 | 8/2003 | Nguyen et al. |
| 6,615,312 | B1 | 9/2003 | Hamlin et al. |
| 6,639,748 | B1 | 10/2003 | Christiansen et al. |
| 6,647,481 | B1 | 11/2003 | Luu et al. |
| 6,654,193 | B1 | 11/2003 | Thelin |
| 6,657,810 | B1 | 12/2003 | Kupferman |
| 6,661,591 | B1 | 12/2003 | Rothberg |
| 6,665,772 | B1 | 12/2003 | Hamlin |
| 6,687,073 | B1 | 2/2004 | Kupferman |
| 6,687,078 | B1 | 2/2004 | Kim |
| 6,687,850 | B1 | 2/2004 | Rothberg |
| 6,690,523 | B1 | 2/2004 | Nguyen et al. |
| 6,690,882 | B1 | 2/2004 | Hanmann et al. |
| 6,691,198 | B1 | 2/2004 | Hamlin |
| 6,691,213 | B1 | 2/2004 | Luu et al. |
| 6,691,255 | B1 | 2/2004 | Rothberg et al. |
| 6,693,760 | B1 | 2/2004 | Krounbi et al. |
| 6,694,477 | B1 | 2/2004 | Lee |
| 6,697,914 | B1 | 2/2004 | Hospodor et al. |
| 6,704,153 | B1 | 3/2004 | Rothberg et al. |
| 6,708,251 | B1 | 3/2004 | Boyle et al. |
| 6,710,951 | B1 | 3/2004 | Cloke |
| 6,711,628 | B1 | 3/2004 | Thelin |
| 6,711,635 | B1 | 3/2004 | Wang |
| 6,711,660 | B1 | 3/2004 | Milne et al. |
| 6,714,371 | B1 | 3/2004 | Codilian |
| 6,715,044 | B2 | 3/2004 | Lofgren et al. |
| 6,717,757 | B1 * | 4/2004 | Levy et al. ........................ 360/31 |
| 6,724,982 | B1 | 4/2004 | Hamlin |
| 6,725,329 | B1 | 4/2004 | Ng et al. |
| 6,735,650 | B1 | 5/2004 | Rothberg |
| 6,735,693 | B1 | 5/2004 | Hamlin |
| 6,744,772 | B1 | 6/2004 | Eneboe et al. |
| 6,745,283 | B1 | 6/2004 | Dang |
| 6,751,402 | B1 | 6/2004 | Elliott et al. |
| 6,754,021 | B1 | 6/2004 | Kisaka et al. |
| 6,757,481 | B1 | 6/2004 | Nazarian et al. |
| 6,772,281 | B2 | 8/2004 | Hamlin |
| 6,781,826 | B1 | 8/2004 | Goldstone et al. |
| 6,782,449 | B1 | 8/2004 | Codilian et al. |
| 6,791,779 | B1 | 9/2004 | Singh et al. |
| 6,792,486 | B1 | 9/2004 | Hanan et al. |
| 6,799,274 | B1 | 9/2004 | Hamlin |
| 6,811,427 | B2 | 11/2004 | Garrett et al. |
| 6,826,003 | B1 | 11/2004 | Subrahmanyam |
| 6,826,614 | B1 | 11/2004 | Hanmann et al. |
| 6,832,041 | B1 | 12/2004 | Boyle |
| 6,832,929 | B2 | 12/2004 | Garrett et al. |
| 6,845,405 | B1 | 1/2005 | Thelin |
| 6,845,427 | B1 | 1/2005 | Atai-Azimi |
| 6,850,443 | B2 | 2/2005 | Lofgren et al. |
| 6,851,055 | B1 | 2/2005 | Boyle et al. |
| 6,851,063 | B1 | 2/2005 | Boyle et al. |
| 6,853,731 | B1 | 2/2005 | Boyle et al. |
| 6,854,022 | B1 | 2/2005 | Thelin |
| 6,862,660 | B1 | 3/2005 | Wilkins et al. |
| 6,880,043 | B1 | 4/2005 | Castro et al. |
| 6,882,486 | B1 | 4/2005 | Kupferman |
| 6,884,085 | B1 | 4/2005 | Goldstone |
| 6,888,831 | B1 | 5/2005 | Hospodor et al. |
| 6,892,217 | B1 | 5/2005 | Hanmann et al. |
| 6,892,249 | B1 | 5/2005 | Codilian et al. |
| 6,892,313 | B1 | 5/2005 | Codilian et al. |
| 6,895,455 | B1 | 5/2005 | Rothberg |
| 6,895,500 | B1 | 5/2005 | Rothberg |
| 6,898,730 | B1 | 5/2005 | Hanan |
| 6,900,958 | B1 | 5/2005 | Yi et al. |
| 6,909,574 | B2 | 6/2005 | Aikawa et al. |
| 6,910,099 | B1 | 6/2005 | Wang et al. |
| 6,928,470 | B1 | 8/2005 | Hamlin |
| 6,931,439 | B1 | 8/2005 | Hanmann et al. |
| 6,934,104 | B1 | 8/2005 | Kupferman |
| 6,934,713 | B2 | 8/2005 | Schwartz et al. |
| 6,940,873 | B2 | 9/2005 | Boyle et al. |
| 6,943,978 | B1 | 9/2005 | Lee |
| 6,948,165 | B1 | 9/2005 | Luu et al. |
| 6,950,267 | B1 | 9/2005 | Liu et al. |
| 6,954,733 | B1 | 10/2005 | Ellis et al. |
| 6,961,814 | B1 | 11/2005 | Thelin et al. |
| 6,965,489 | B1 | 11/2005 | Lee et al. |
| 6,965,563 | B1 | 11/2005 | Hospodor et al. |
| 6,965,966 | B1 | 11/2005 | Rothberg et al. |
| 6,967,799 | B1 | 11/2005 | Lee |
| 6,968,422 | B1 | 11/2005 | Codilian et al. |
| 6,968,450 | B1 | 11/2005 | Rothberg et al. |
| 6,973,495 | B1 | 12/2005 | Milne et al. |
| 6,973,570 | B1 | 12/2005 | Hamlin |
| 6,976,190 | B1 | 12/2005 | Goldstone |
| 6,983,316 | B1 | 1/2006 | Milne et al. |
| 6,986,007 | B1 | 1/2006 | Procyk et al. |
| 6,986,154 | B1 | 1/2006 | Price et al. |
| 6,995,933 | B1 | 2/2006 | Codilian et al. |
| 6,996,501 | B1 | 2/2006 | Rothberg |
| 6,996,669 | B1 | 2/2006 | Dang et al. |
| 7,002,926 | B1 | 2/2006 | Eneboe et al. |
| 7,003,674 | B1 | 2/2006 | Hamlin |
| 7,006,316 | B1 | 2/2006 | Sargenti, Jr. et al. |
| 7,009,820 | B1 | 3/2006 | Hogg |
| 7,019,934 | B1 * | 3/2006 | Andersen ........................ 360/75 |
| 7,023,639 | B1 | 4/2006 | Kupferman |
| 7,024,491 | B1 | 4/2006 | Hanmann et al. |
| 7,024,549 | B1 | 4/2006 | Luu et al. |
| 7,024,614 | B1 | 4/2006 | Thelin et al. |
| 7,027,716 | B1 | 4/2006 | Boyle et al. |

(56) References Cited

U.S. PATENT DOCUMENTS

| | | |
|---|---|---|
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,349,174 B2 * | 3/2008 | Bi et al. ............ 360/78.09 |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,433,140 B2 * | 10/2008 | Matsumoto ............ 360/31 |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,545,593 B1 | 6/2009 | Sun et al. |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,633,698 B2 * | 12/2009 | Finamore et al. ............ 360/60 |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,037,348 B2 * | 10/2011 | Wei et al. ............ 714/6.3 |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |

(56) References Cited

U.S. PATENT DOCUMENTS

| | | |
|---|---|---|
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,482,876 B2 * | 7/2013 | Colligan .................. 360/69 |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

James N. Malina, U.S. Appl. No. 13/526,241, filed Jun. 18, 2012, 38 pages.

* cited by examiner

PRECAUTIONARY MEASURES FOR DATA STORAGE DEVICE ENVIRONMENTAL CONDITIONS

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). Another type of storage media can include a solid-state memory where cells are charged to store data.

Oftentimes an environmental condition of a DSD, such as vibration, mechanical shock, temperature, humidity, or air pressure, can cause problems when writing data to or reading data from a storage medium of a DSD. Such errors caused by environmental conditions can reduce the reliability and performance of the DSD. With respect to performance, a DSD may repeatedly attempt to perform a failed write command before aborting the write command. This type of error recovery may waste resources if an environmental condition causing the write error persists.

In addition, certain storage media may be particularly susceptible to errors caused by environmental conditions. For example, a disk using Shingled Magnetic Recording (SMR) may be more susceptible to errors caused by vibration, mechanical shock, or changes in temperature, humidity, or air pressure. SMR has been introduced as a way of increasing the amount of data that can be stored in a given area on a disk by overlapping tracks to increase the number of Tracks Per Inch (TPI). Although a higher number of TPI is ordinarily possible with SMR, the higher track density can lead to a greater vulnerability to errors caused by environmental conditions.

In addition, the number of write retries allowed in one location is often limited in SMR DSDs due to the greater effect of Adjacent Track Interference (ATI) and Wide Area Track Erasure (WATER) on SMR media. Write retries are therefore often made in different locations on an SMR media, which can be costly in terms of space on the media. Multiple write retries spread across the media can also increase the need for maintenance operations such as garbage collection to reclaim the portions of the media used for the failed write retries.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
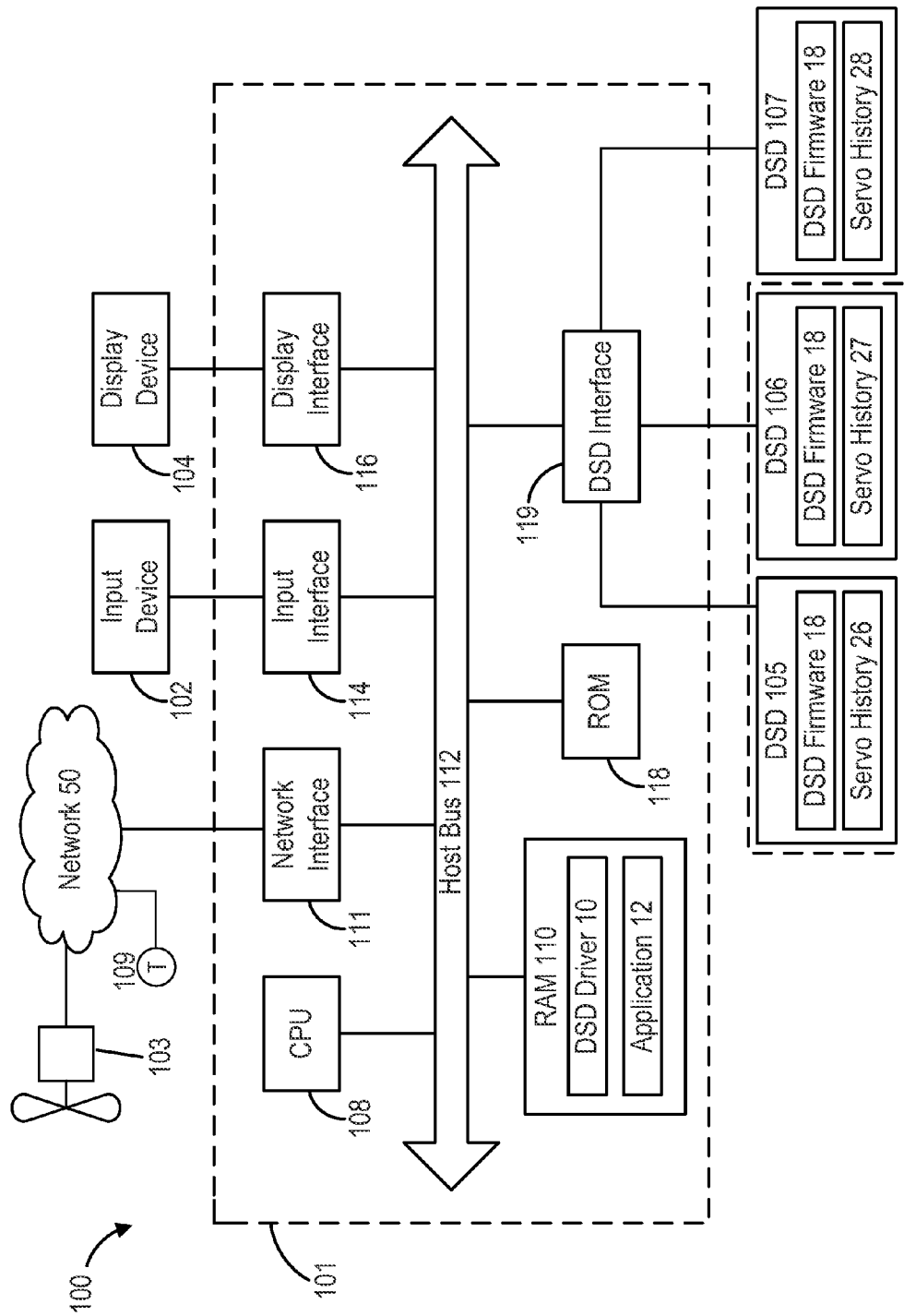
FIG. 1 is a block diagram depicting a system including Data Storage Devices (DSDs) according to an embodiment.

FIG. 1 shows system 100 according to an embodiment which includes host 101, input device 102, display device 104 and Data Storage Devices (DSDs) 105, 106, and 107. System 100 can be, for example, a data storage center or other computer system that uses multiple DSDs. In addition, system 100 may be a stand-alone system or part of a network, such as network 50, which can, for example, be a local or wide area network, or the Internet. As shown in FIG. 1, the example embodiment of FIG. 1 also includes fan 103 and temperature sensor 109 connected to host 101 via network 50. Host 101 can control an environmental condition (e.g., temperature) of DSDs 105, 106, and 107 with the use of fan 103 and temperature sensor 109.

Those of ordinary skill in the art will appreciate that system 100 can include more or less than those elements shown in FIG. 1 and that the disclosed processes can be implemented in other environments. For example, other embodiments may only include one DSD.

In the example of FIG. 1, DSDs 105 and 106 are grouped together in one location, such as a storage rack, and DSD 107 is in a different location, such as in a different storage rack. In other embodiments, DSDs 105, 106, and 107 may be in different locations.

Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 108 interfaces with host bus 112. Also interfacing with host bus 112 are Random Access Memory (RAM) 110, input interface 115 for input device 102, display interface 116 for display device 104, Read Only Memory (ROM) 118, network interface 111, and DSD interface 119 for DSDs 105, 106, and 107.

RAM 110 is a volatile memory of host 101 that interfaces with host bus 112 to provide information stored in RAM 110 to CPU 108 during execution of instructions in software programs such as DSD driver 10 or application 12. More specifically, CPU 108 first loads computer-executable instructions from a DSD into a region of RAM 110. CPU 108 can then execute the stored process instructions from RAM 110. Data to be stored in or retrieved from DSDs 105, 106, and 107 can also be stored in RAM 110 so that the data can be accessed by CPU 108 during execution of software programs to the extent that such software programs have a need to access and/or modify the data.

As shown in FIG. 1, RAM 110 can be configured to store DSD driver 10 and application 12. DSD driver 10 provides a software interface for DSDs 105, 106, and 107 on host 101, and can be used by host 101 to perform certain processes discussed below. Application 12 can provide a software interface for controlling fan 103 or monitoring a temperature input provided by temperature sensor 109.

DSD interface 119 is configured to interface host 101 with DSDs 105, 106, and 107, and can interface according to a Serial Advanced Technology Attachment (SATA) standard. In other embodiments, DSD interface 119 can interface with the DSDs using other standards such as, for example, PCI express (PCIe) or Serial Attached SCSI (SAS).

Each of DSDs 105, 106, and 107 are shown in FIG. 1 as storing DSD firmware 18 and a servo history (i.e., servo histories 26, 27, and 28). As discussed in more detail below, DSD firmware 18 can be used to control operation of the DSDs and to perform some of the safe write processes described below.

In some implementations, servo histories 26, 27, and 28 can be used to obtain environmental information about an environmental condition. Each of DSDs 105, 106, and 107 include a servo system (e.g., servo system 121 in FIG. 2) for controlling the positioning of a head (e.g., head 136 in FIG. 2) over a disk (e.g., disk 200 in FIG. 2). Servo histories 26, 27, and 28 can include a record for their respective DSD of a number of times the head was outside of one or more write unsafe thresholds during a predetermined period of time or an amount of time since the head was outside of one or more write unsafe thresholds. This information can indicate an environmental condition such as vibration or mechanical shock or a severity of an environmental condition. Examples of write unsafe thresholds are explained in more detail below with reference to FIG. 3.

Figure 2:
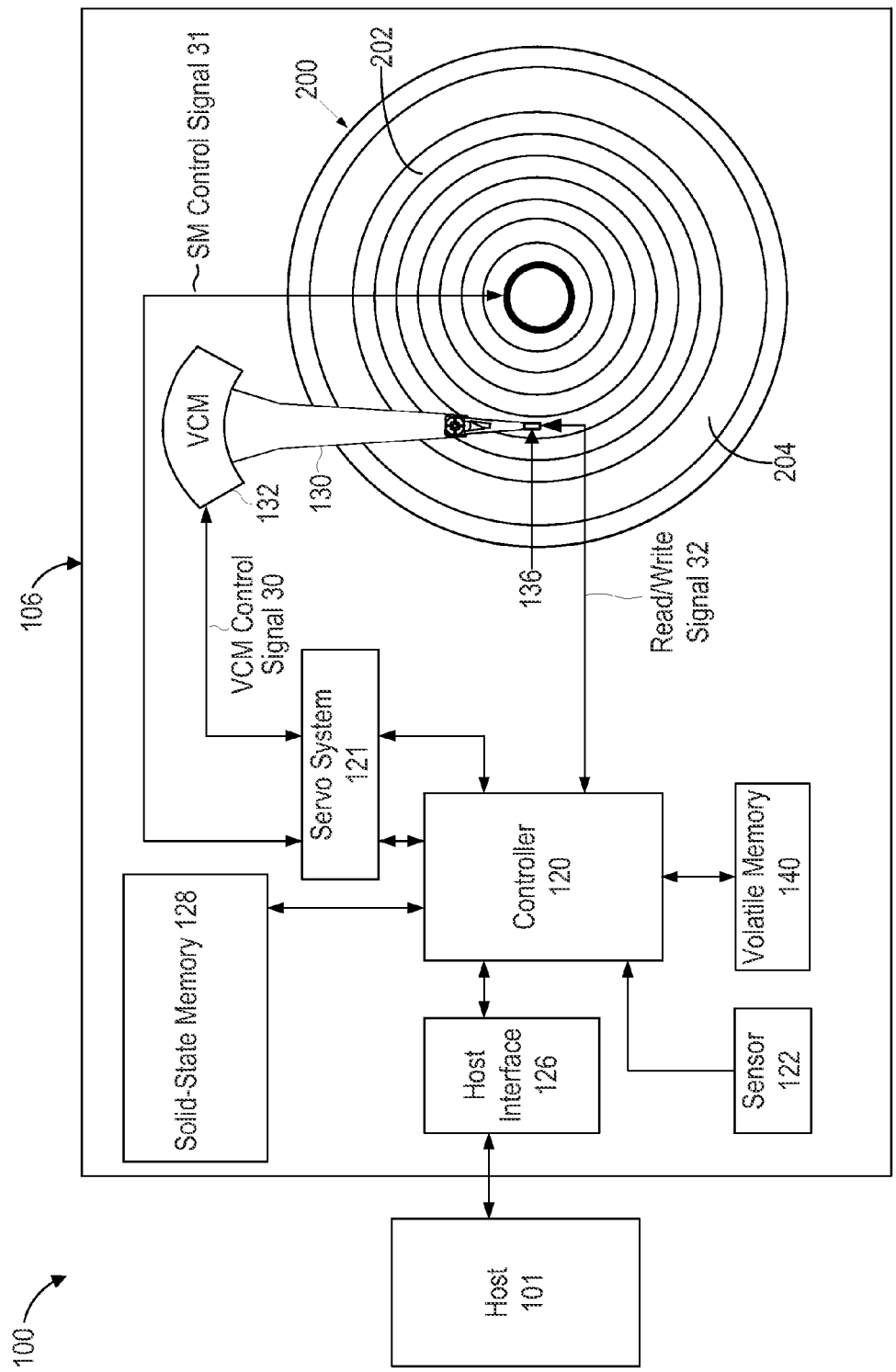
FIG. 2 is a block diagram depicting a DSD of FIG. 1 according to an embodiment.

FIG. 2 depicts a block diagram of DSD 106 according to an embodiment where DSD 106 includes Non-Volatile Memory (NVM) in the form of rotating magnetic disk 200 and solid-state memory 128. In this regard, DSD 106 can be considered a Solid-State Hybrid Drive (SSHD) since it includes both solid-state and disk media. In other embodiments, each of disk 200 or solid-state memory 128 may be replaced by multiple Hard Disk Drives (HDDs) or multiple Solid-State Drives (SSDs), respectively, so that DSD 106 includes pools of HDDs and/or SSDs. In addition, DSD 106 in other embodiments can include different types of recording media or may only include solid-state memory 128 or disk 200.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC).

Host interface 126 is configured to interface DSD 106 with host 101 and may interface according to a standard such as, for example, PCIe, SATA, or SAS. As will be appreciated by those of ordinary skill in the art, host interface 126 can be included as part of controller 120. Although FIGS. 1 and 2 depict the co-location of host 101 and DSD 106, in other embodiments the two need not be physically co-located. In such embodiments, DSD 106 may be located remotely from host 101 and connected to host 101 via a network interface.

In the example of FIG. 2, disk 200 is rotated by a spindle motor (not shown) and head 136 is positioned to read and write data from the surface of disk 200. In more detail, head 136 is connected to the distal end of actuator 130 which is rotated by Voice Coil Motor (VCM) 132 to position head 136 over disk 200.

As shown in FIG. 2, disk 200 includes a number of radially spaced, concentric tracks 202 for storing data. In some implementations, tracks 202 may be written using Shingled Magnetic Recording (SMR) such that tracks 202 overlap. As noted above, such overlapping tracks can create a greater vulnerability to write errors caused by environmental conditions and can make write retries more costly in terms of space on disk 200 and performance of DSD 106. In other implementations, tracks 202 may not overlap or disk 200 may include both overlapping and non-overlapping tracks 202.

Figure 3:
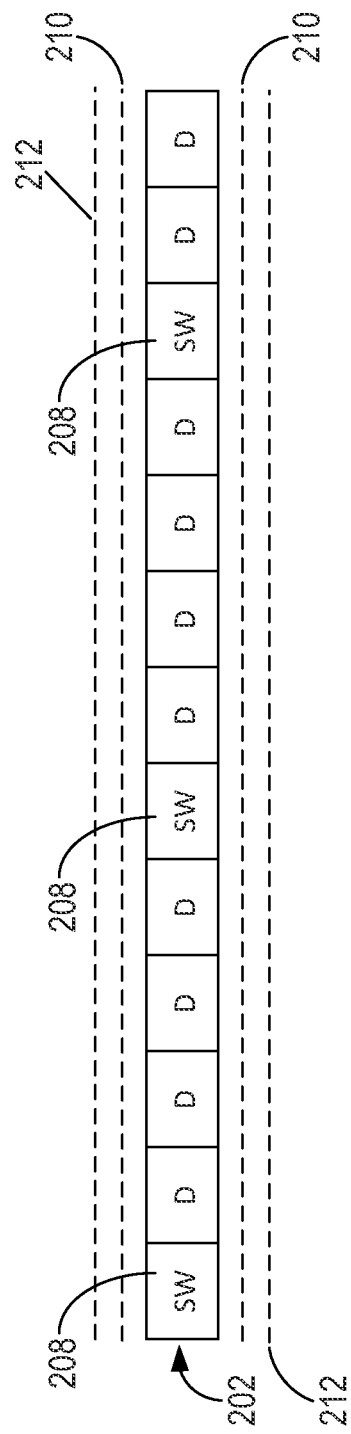
FIG. 3 is a diagram illustrating a write unsafe threshold for a track according to an embodiment.

Servo system 121 controls the rotation of disk 200 with SM control signal 31 and controls the position of head 136 using VCM control signal 30. In more detail, FIG. 3 illustrates an example of a track 202 on disk 200 that includes servo wedges 208 spaced every five sectors as indicated by the servo wedge sectors with "SW" and user data sectors indicated with a "D." Each servo wedge may include servo information that can be read from disk 200 by head 136 to determine the position of head 136 over disk 200. For example, each servo wedge may include a pattern of alternating magnetic transitions (servo burst), which may indicate a particular wedge number on disk 200.

FIG. 3 also depicts write unsafe thresholds 210 and 212 with dashed lines that are a predetermined distance from the center of track 202. In other embodiments, a different number of write unsafe thresholds can be used.

Write unsafe thresholds 210 and 212 can provide different margins of deviation from the center of track 202 when writing data. For example, if head 136 travels outside of write unsafe thresholds 212 while writing data, head 136 will stop writing data and treat the write as a write error. Such deviation from track 202 may occur, for example, during a vibration condition of DSD 106 (e.g., when a fan of host 101 is running) or during a mechanical shock event of DSD 106 (e.g., when system 100 is bumped).

Write unsafe thresholds 210, on the other hand, may be used as a warning that an environmental condition is close to causing a write error. To reduce future write errors, DSD 106 may use write unsafe thresholds 210 to predict a future write error and/or trigger a corrective action to reposition head 136 toward the center of track 202. In addition, write unsafe thresholds 210 and 212 may be dynamic in that they can change based on the detection of different environmental conditions. For example, the detection of a vibration condition from a sensor (e.g., sensor 122 in FIG. 2) may call for write unsafe thresholds 210 and 212 to move closer toward the center of track 202.

Servo system 121 can record in servo history 27 a number of times head 136 travels outside of write unsafe thresholds 210 and/or 212 during a predetermined period of time or an amount of time since head 136 was outside of write unsafe thresholds 210 and/or 212. Controller 120 can then use servo history 27 as environmental information about an environmental condition of DSD 106 such as a vibration or mechanical shock condition.

Returning to FIG. 2, disk 200 includes reserved area 204 for writing test data in accordance with a precautionary measure. In one embodiment, host 101 may send a test write command to write test data in reserved area 204 before sending a write command to determine if it is safe to write data on disk 200. An example of a test write process is discussed in more detail below with reference to FIG. 4B. In other embodiments, disk 200 may include multiple reserved areas for writing test data or reserved area 204 may be located in a different portion of disk 200 than that shown in FIG. 2. Reserved area 204 may also include a guard band to reduce the likelihood of writing in reserved area 204 having an effect on data stored near reserved area 204.

In the example of FIG. 2, DSD 106 also includes volatile memory 140. Volatile memory 140 can include, for example, a Dynamic Random Access Memory (DRAM) which can be used by DSD 106 to temporarily store data. Data stored in volatile memory 140 can include data read from NVM such as disk 200 or solid-state memory 128, data to be written to NVM, instructions loaded from DSD firmware 18 for execution by controller 120, and/or data used in executing DSD firmware 18.

As shown in FIG. 2, DSD 106 also includes sensor 122 for obtaining environmental information about an environmental condition of DSD 106. Sensor 122 can include one or more environmental sensors such as, for example, a mechanical shock sensor, a vibration sensor, an accelerometer (e.g., XYZ or YPR accelerometer), a temperature sensor, a humidity sensor, or an air pressure sensor. In addition, one type of sensor can be used to indicate multiple environmental conditions. For example, an accelerometer can be used to indicate both vibration and mechanical shock conditions or an air pressure sensor can be used to indicate changes in altitude and changes in air pressure.

In operation, host interface 126 receives host read and write commands from host 101 via host interface 126 for reading data from and writing data to NVM. In response to a write command from host 101, controller 120 may buffer the data to be written for the write command in volatile memory 140.

For data to be written on disk 200, a read/write channel (not shown) of controller 120 may encode the buffered data into write signal 32 which is provided to head 136 for magnetically writing data to a corresponding disk surface. Servo system 121 can provide VCM control signal 30 to VCM 132 to position head 136 over a particular track 202 for writing the data.

In response to a read command for data stored on disk 200, servo system 121 positions head 136 over a particular track 202. Controller 120 controls head 136 to magnetically read data stored in the track and to send the read data as read signal 32. A read/write channel of controller 120 can then decode and buffer the data into volatile memory 140 for transmission to host 101 via host interface 126.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101 via host interface 126.

Host-Side Write Safe Examples

Figure 4A:
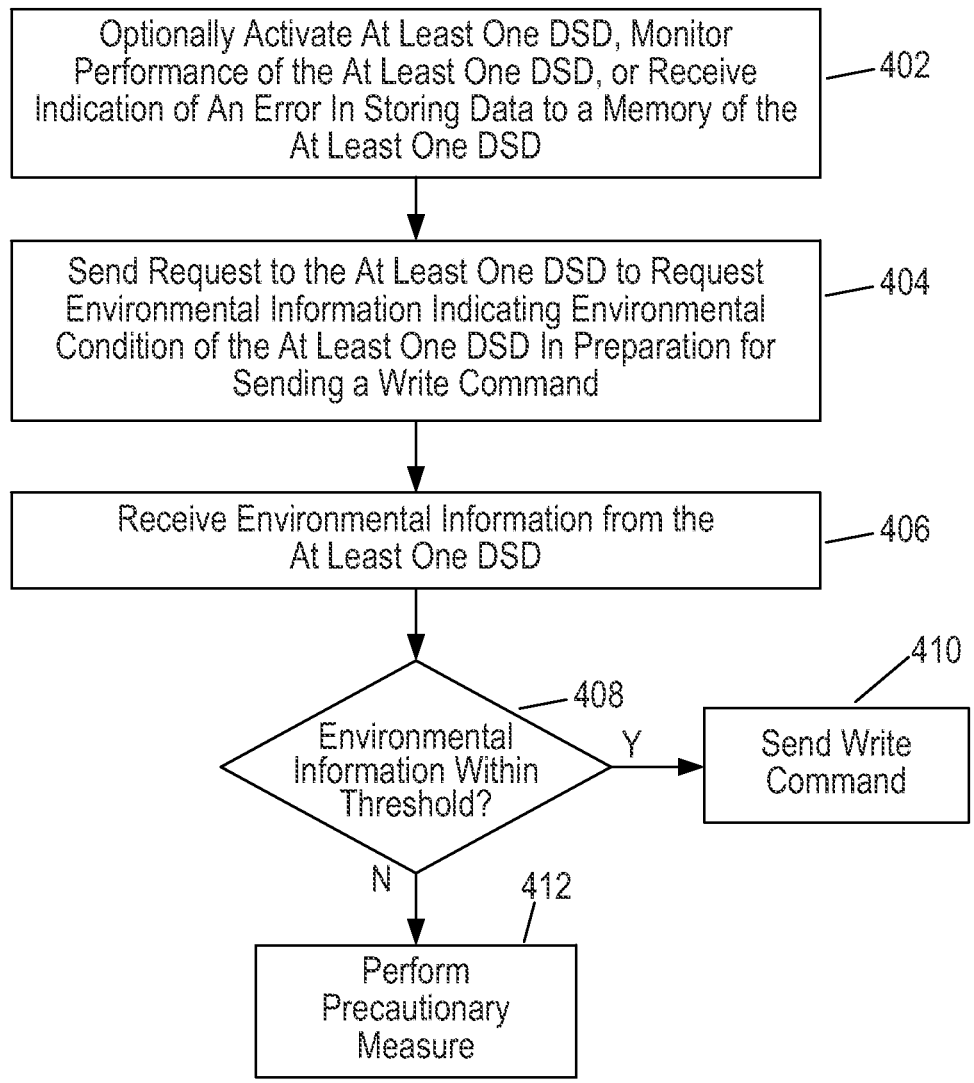
FIG. 4A is a flowchart for a write safe process according to an embodiment.

FIG. 4A is a flowchart for a write safe process that can be performed by CPU 108 of host 101 executing DSD driver 10 according to an embodiment. In other embodiments, the process of FIG. 4A may be performed by executing a file system of host 101, such as a file system for implementing SMR. In some embodiments, the process of FIG. 4A can be performed in preparation for sending a write command to one or more DSDs. In addition, the process of FIG. 4A can be performed periodically by host 101 or based upon an activation of one or more DSDs, a performance of one or more DSDs, or an indication of an error in storing data in one or more DSDs.

In block 402, CPU 108 optionally activates at least one DSD (e.g., DSD 106), monitors a performance of at least one DSD, or receives an indication of an error in storing data to a memory of at least one DSD. For example, the process of FIG. 4A can be initiated upon the startup of a DSD to check if there is an environmental condition that may make it unsafe to write data to the DSD. In another implementation, host 101 monitors a performance of a DSD in performing write commands to determine if it is taking too long to perform the write commands. In another implementation, the process of FIG. 4A is initiated after receiving an indication of a write error for a failed attempt to store data in a memory of a DSD. In other embodiments, block 402 may be omitted such that the process of FIG. 4A is initiated based on another indication such as a temperature read from temperature sensor 109, after a predetermined period of time, or after sending a certain number of write commands to a DSD.

In block 404, CPU 108 sends a request via DSD interface 119 to the at least one DSD to request environmental information indicating a current environmental condition. In the embodiment of FIG. 4A, CPU 108 sends the request in preparation for sending a write command. The request can include or form part of a Vendor Specific Command (VSC) to query the at least one DSD whether it is safe to write data to a memory (e.g., disk 200) of the at least one DSD.

In block 406, CPU 108 receives real-time environmental information from the at least one DSD via DSD interface 119. The environmental information can, for example, include a binary value indicating a certain environmental condition or the environmental information may include a value obtained from sensor 122 or servo system 121. The environmental information may include several different values indicating different types of environmental conditions such as acceleration values and temperature values.

In block 408, CPU 108 determines whether the environmental information received in block 406 is within a threshold. For example, CPU 108 may compare the received environmental information to high and low thresholds indicating an environmental condition such as a temperature, mechanical shock, acceleration, humidity, or air pressure condition. DSD 106 may have predetermined operating ranges for conditions such as temperature, humidity, and air pressure that can be used to define upper and lower thresholds. In some embodiments, the environmental information can be compared to different types of thresholds indicating different types of environmental conditions, such as both temperature and humidity conditions.

In some implementations, CPU 108 may assign a write safety level to the at least one DSD based on the comparison of the environmental information to a threshold. The write safety level corresponds to a relative likelihood of encountering an error when storing data due to an environmental condition. For example, environmental information received from DSD 106 in block 406 (e.g., a magnitude from an accelerometer) may be outside of a warning threshold but still within a critical threshold. In such a case, CPU 108 can assign a warning level to DSD 106 such that some but not all future write commands may be redirected away from DSD 106 until the environmental condition improves.

The warning level or received environmental information can also be used for troubleshooting or indicating an environmental condition to a user of host 101 through a user interface. In one example, host 101 may request environmental information from multiple DSDs located throughout a room to help identify a source causing an environmental condition.

With reference to the process of FIG. 4A, CPU 108 sends a write command to the at least one DSD in block 410 if the environmental information is within the threshold. On the other hand, if the environmental information is not within the threshold, the process continues to block 412 where CPU 108 performs a precautionary measure.

FIGS. 4B to 4E provide examples of different precautionary measures that can be performed by CPU 108 executing DSD driver 10 or a particular file system according to various embodiments. In some implementations, the precautionary measures of FIGS. 4B to 4E can be combined and performed in different orders until it is determined that it is safe to send a write command to the at least one DSD.

Figure 4B:
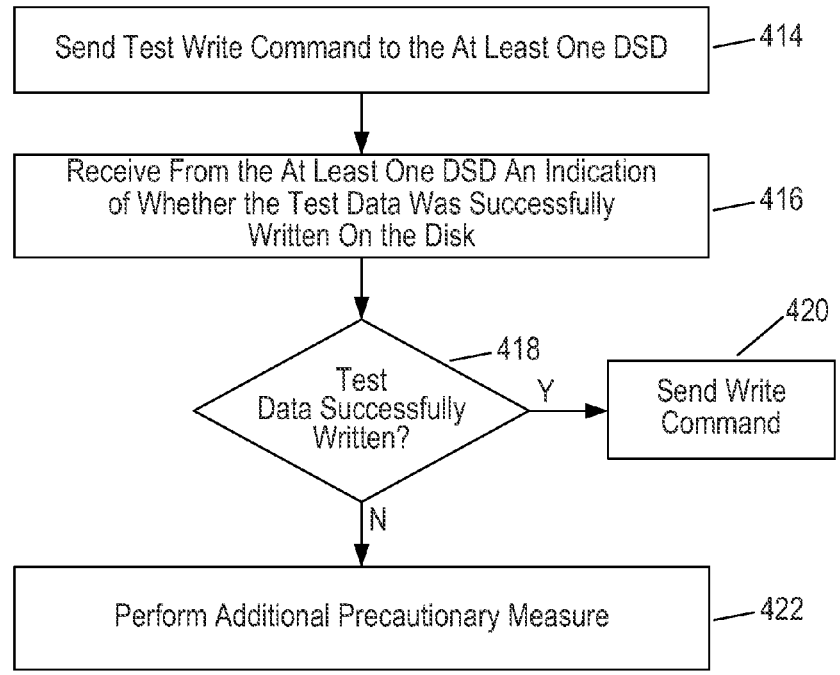
FIG. 4B is a flow chart for a test write process according to an embodiment.

FIG. 4B is a flow chart for a test write process that can be performed by CPU 108 as a precautionary measure according to an embodiment. CPU 108 may send a test write command to one or more DSDs to check if test data can be successfully written to the one or more DSDs.

In block 414, CPU 108 sends a test write command via DSD interface 119 to at least one DSD. The test write command can include test data to be written in a reserved area of a memory such as reserved area 204 on disk 200. The test write command may also indicate a length of time for performing the test write command. Reserved area 204 can be arranged so as to allow DSD 106 to continuously write test data for a predetermined period of time. The test data can later be overwritten with other test data for performing a new test write command.

In one implementation, reserved area 204 can include tracks at a different track pitch than tracks located elsewhere on the disk. For example, reserved area 204 can include tracks that are more closely spaced than other areas of disk 200 so that an environmental condition is more likely to affect the writing of the test data than data written elsewhere on disk 200.

In block 416, CPU 108 receives an indication via DSD interface 119 from the at least one DSD of whether the test data was successfully written in reserved area 204. If it is determined in block 418 that the test data was successfully written, CPU 108 sends a write command to the at least one DSD in block 420 since the indication received in block 416 indicates that it is safe to write data.

If it is determined in block 418 that the test data was not successfully written, CPU 108 performs an additional precautionary measure such as repeating the process of FIG. 4B or performing the precautionary measures of FIG. 4C, 4D, or 4E discussed below.

Figure 4C:
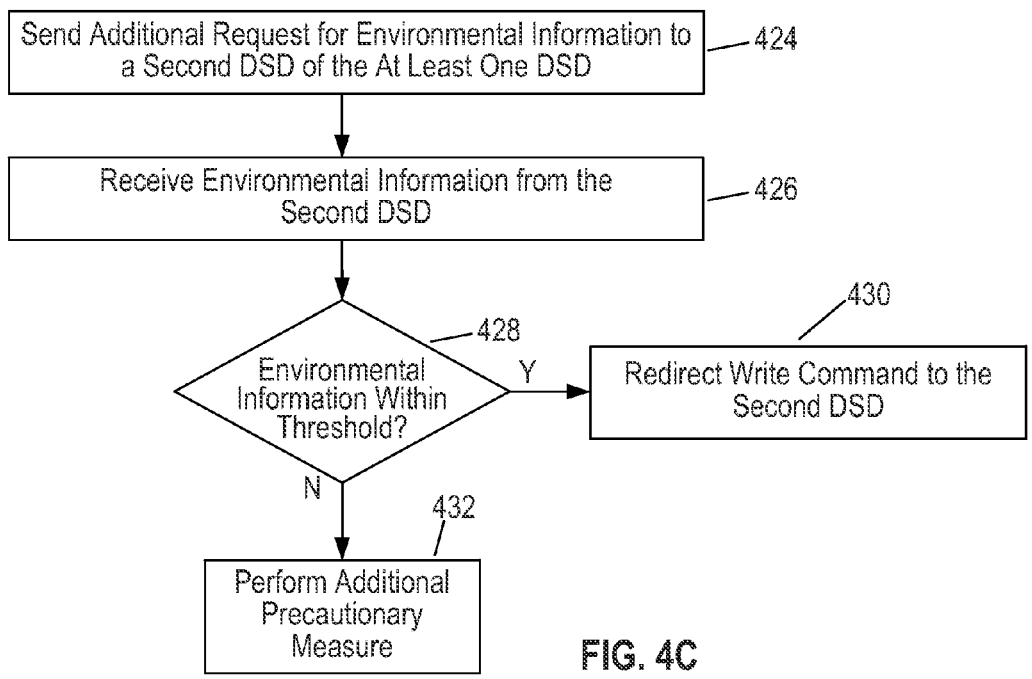
FIG. 4C is a flow chart for a write redirection process according to an embodiment.

FIG. 4C is a flow chart for a write redirection process that can be performed as a precautionary measure by CPU 108 according to an embodiment. In block 424, CPU 108 sends an additional request for environmental information to a second DSD via DSD interface 119. For example, CPU 108 may have already performed the process of FIG. 4A with DSD 106 and determined that the environmental information received from DSD 106 was not within the threshold. As a precautionary measure, CPU 108 may consider sending a write command to DSD 107 instead of to DSD 106 since DSD 107 is in a different rack or location than DSD 106.

In block 426, CPU 108 receives environmental information from the second DSD (e.g., DSD 107) via DSD interface 119 indicating an environmental condition of DSD 107. In block 428, CPU 108 determines whether the environmental information is within a threshold. If so, CPU 108 redirects a write command from the first DSD to the second DSD in block 430. If the environmental information is not within the threshold, the process proceeds to block 432 where CPU 108 performs an additional precautionary measure such as repeating the process of FIG. 4C with a different DSD or performing a precautionary measure of FIG. 4B, 4D, or 4E.

Figure 4D:
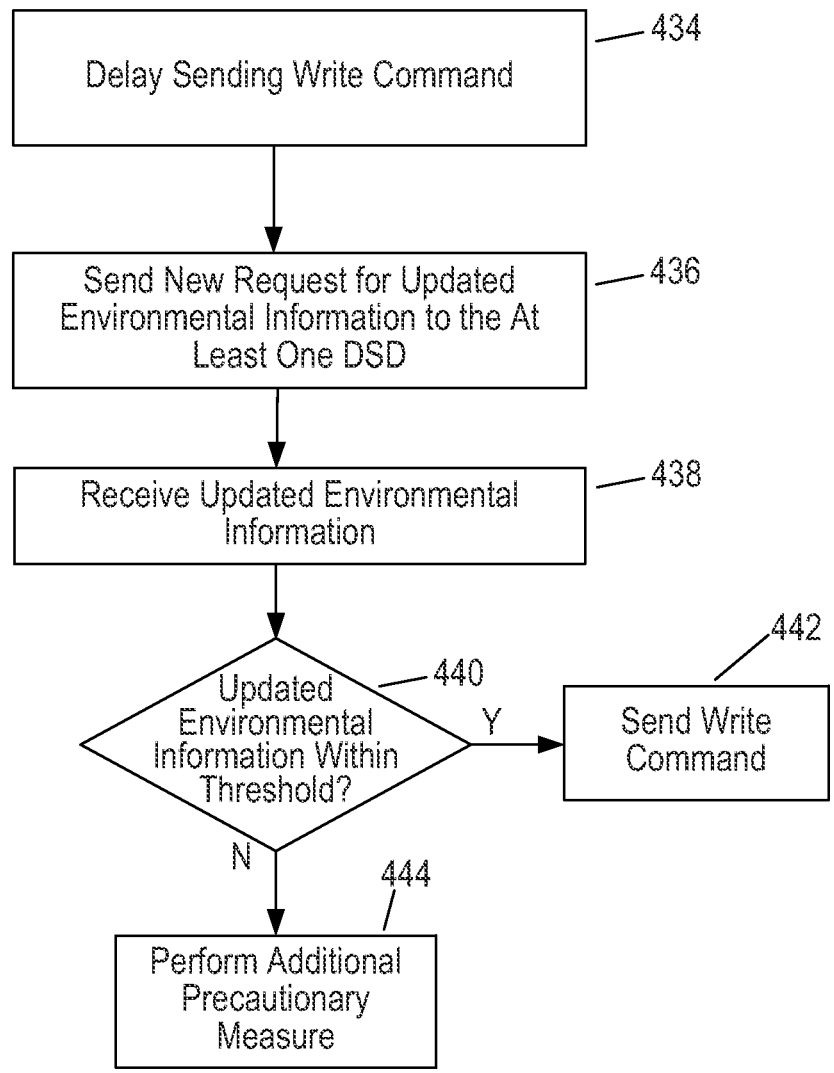
FIG. 4D is a flow chart for a delay process according to an embodiment.

FIG. 4D is a flow chart for a delay process performed as a precautionary measure by CPU 108 according to an embodiment. In block 434, CPU 108 delays sending a write command and sends a new request for updated environmental information to the at least one DSD in block 436. The delay process of FIG. 4D can be particularly effective for more transient environmental conditions such as a temporary vibration or mechanical shock condition.

In block 438, CPU 108 receives updated environmental information from the at least one DSD via DSD interface 119. In block 440, CPU 108 determines whether the updated environmental information is within the threshold. If so, CPU 108 sends the write command to the at least one DSD in block 442. If not, CPU 108 performs an additional precautionary measure in block 444. The additional precautionary measure can include repeating the process of FIG. 4D or performing any of the precautionary measures of FIG. 4B, 4C, or 4E.

Figure 4E:
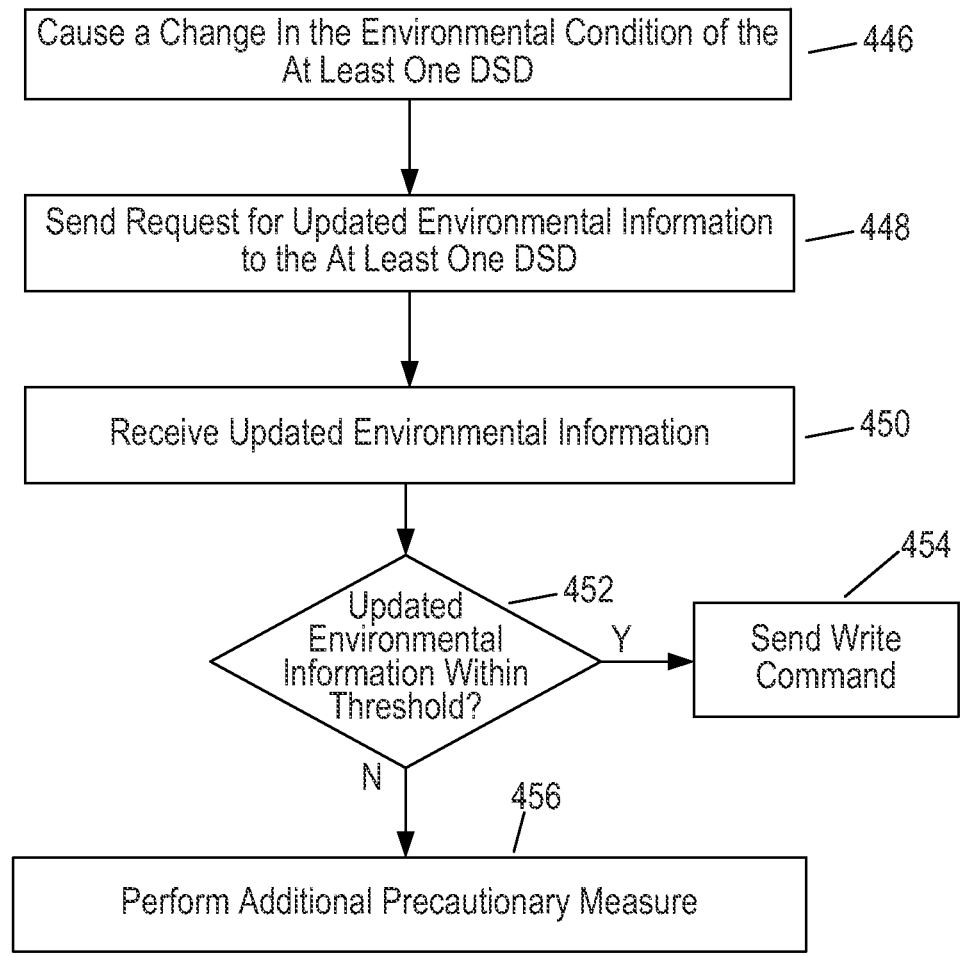
FIG. 4E is a flowchart for an environmental change process according to an embodiment.

FIG. 4E is a flowchart for an environmental change process performed as a precautionary measure by CPU 108 according to an embodiment. In block 446, CPU 108 causes a change in the environmental condition of the at least one DSD. This may be performed, for example, by CPU 108 executing application 12 to turn on fan 103 via network 50 to change a temperature or humidity of the environment of DSDs 105 and 106. Other changes caused by CPU 108 may include changing a temperature set point for a room housing the DSDs or turning on or off a fan for a particular rack of DSDs. In one example, CPU 108 may mute speakers that may cause a vibration of the DSD.

In block 448, CPU 108 sends a request for updated environmental information via DSD interface 119 to the at least one DSD. CPU 108 receives the updated environmental information via DSD interface 119 in block 450.

In block 452, CPU 108 determines whether the updated environmental information is within the threshold. If so, CPU 108 sends the write command to the at least one DSD in block 454. Otherwise, CPU 108 performs an additional precautionary measure in block 456. The additional precautionary measure can include repeating the process of FIG. 4E or performing any of the precautionary measures of FIGS. 4B to 4D.

DSD-Side Write Safe Examples

Figure 5A:
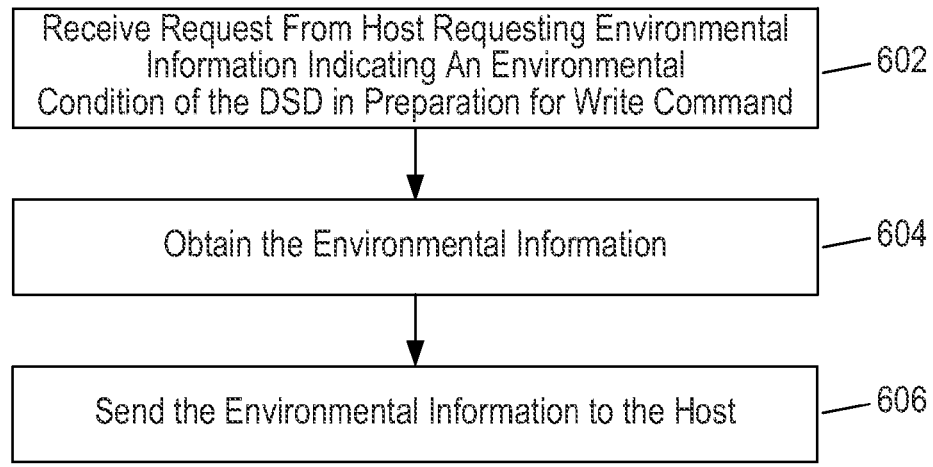
FIG. 5A is a flowchart for a write safe process performed by a DSD according to an embodiment.

FIG. 5A is a flowchart for the DSD-side of a write safe process according to an embodiment. In one embodiment, the process of FIG. 5A can be performed by controller 120 of DSD 106 by executing DSD firmware 18.

In block 602, DSD 106 receives a request from host 101 via host interface 126 requesting environmental information. Host 101 may request the environmental information to determine a current environmental condition of DSD 106 in preparation for sending a write command to DSD 106.

In block 604, controller 120 obtains real-time environmental information, which can include obtaining a value from sensor 122, servo history 27, or another indication from servo system 121. In block 606, controller 120 sends the requested environmental information to host 101 via host interface 126.

Figure 5B:
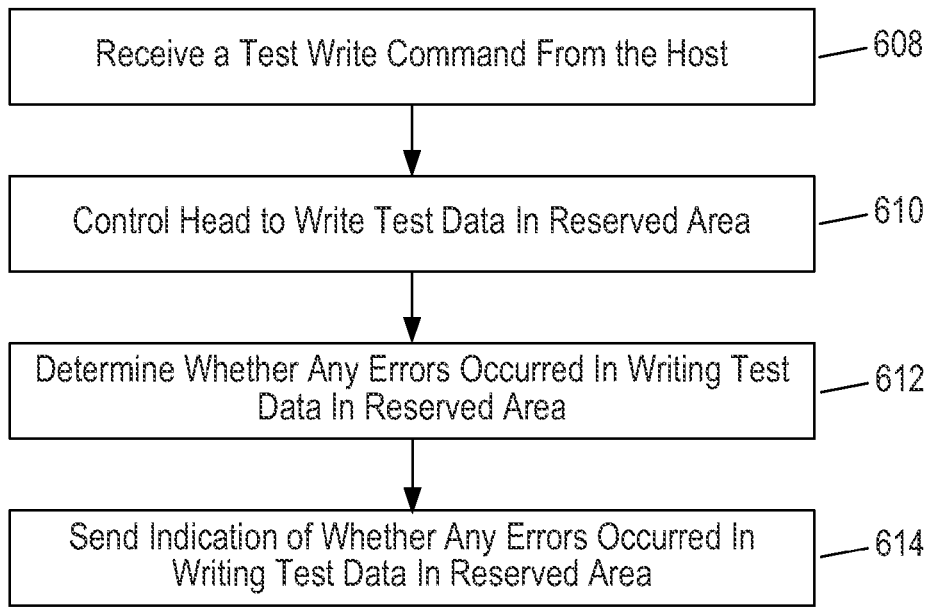
FIG. 5B is a flowchart for a test write process performed by a DSD according to an embodiment.

FIG. 5B is a flowchart for a test write process performed by a DSD according to an embodiment. In one embodiment, the process of FIG. 5B can be performed by controller 120 of DSD 106 by executing DSD firmware 18. The process of FIG. 5B may be performed after performing the process of FIG. 5A if host 101 determines that the environmental information sent from DSD 106 is outside of a threshold. In other examples, DSD 106 may perform the process of FIG. 5B without having first sent environmental information to host 101. In such a case, host 101 may periodically test DSD 106 to determine whether it is safe to send a write command to DSD 106.

In block 608, controller 120 receives a test write command from host 101 via host interface 126. As noted above, the test write command can include test data for writing in reserved area 204. In other implementations, the test write command may only provide a command for controller 120 to perform a test write routine. The test data may then come from a memory of DSD 106 or may be encoded as part of DSD firmware 18 or controller hardware. The test write command may also specify a period of time for writing the test data.

In block 610, controller 120 controls head 136 via servo system 121 to write test data in reserved area 204. The test data may be written for a continuous period of time in reserved area 204 to better detect a transient environmental condition that may make writing unsafe.

In block 612, controller 120 determines whether any errors occurred in writing the test data in reserved area 204. This determination may be made by an indication from servo system 121 that head 136 travelled outside of write unsafe threshold 210 or may be made on the basis of a portion of servo history 27. In other implementations, controller 120 may attempt to read the test data written in reserved area 204 to check for errors.

In block 614, controller 120 sends an indication of whether any errors occurred in writing the test data. This indication may include a pass or fail status for the test write command or may include a portion of servo history 27 providing more detailed information on errors encountered when writing the test data in reserved area 204.

By providing host 101 with current and localized environmental information, it is ordinarily possible to reduce the cost in resources (e.g., repeated write retries) involved with write error recovery when an environmental condition has caused a write error. In addition, the precautionary measures discussed above can improve the performance of write error recovery.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A host in communication with at least one Data Storage Device (DSD), the host comprising:
   an interface for communicating with the at least one DSD; and
   a processor configured to:
      send a request to the at least one DSD via the interface in preparation for sending a write command to the at least one DSD to store data in the at least one DSD, wherein the request is for environmental information indicating an environmental condition of the at least one DSD that is based on a number of times the at least one DSD has exceeded a write unsafe threshold within a predetermined period of time or an amount of time since the at least one DSD has exceeded the write unsafe threshold, and wherein the write unsafe threshold is a predetermined distance from a center of a track on a disk of the at least one DSD;
      receive the environmental information from the at least one DSD via the interface;
      determine whether the environmental information is within a threshold;

send the write command to the at least one DSD via the interface if the environmental information is within the threshold; and perform a precautionary measure if the environmental information is not within the threshold.

2. The host of claim 1, wherein in performing the precautionary measure the processor is further configured to:
send a test write command to the at least one DSD via the interface, wherein the test write command causes the at least one DSD to write test data on a disk of the at least one DSD; and
receive from the at least one DSD via the interface an indication of whether the test data was successfully written on the disk.

3. The host of claim 1, wherein in performing the precautionary measure the processor is further configured to delay sending the write command.

4. The host of claim 1, wherein in performing the precautionary measure the processor is further configured to send an additional request for environmental information to a second DSD of the at least one DSD.

5. The host of claim 1, wherein in preforming the precautionary measure the processor is further configured redirect the write command to a second DSD of the at least one DSD.

6. The host of claim 1, wherein the environmental condition includes at least one of a vibration condition of the at least one DSD and a mechanical shock condition of the at least one DSD.

7. The host of claim 1, wherein the processor is further configured to assign a write safety level from at least three write safety levels to the at least one DSD based on the received environmental information, the at least three write safety levels corresponding to relative likelihoods of encountering an error when storing data in the at least one DSD due to the environmental condition.

8. The host of claim 1, wherein the processor is further configured to:
monitor a performance of the at least one DSD in performing a previous write command; and
send the request to the at least one DSD based on the monitored performance of the at least one DSD.

9. The host of claim 1, wherein the processor is further configured to:
receive an indication of an error in storing data to a memory of the at least one DSD; and
send the request to the at least one DSD based on the received indication of the error.

10. The host of claim 1, wherein in performing the precautionary measure the processor is further configured to cause a change in the environmental condition of the at least one DSD.

11. The host of claim 1, wherein the processor is further configured to: activate the at least one DSD; and
send the request to the at least one DSD based on the activation of the at least one DSD.

12. The host of claim 1, wherein the processor is further configured to execute a file system for writing data in overlapping tracks on a disk of the at least one DSD, and wherein the at least one DSD includes at least one area of overlapping tracks on the disk.

13. A method of preparing to send a write command to at least one Data Storage Device (DSD) to store data in the at least one DSD, the method comprising:
sending a request to the at least one DSD to request environmental information indicating an environmental condition of the at least one DSD that is based on a number of times the at least one DSD has exceeded a write unsafe threshold within a predetermined period of time or an amount of time since the at least one DSD has exceeded the write unsafe threshold, and wherein the write unsafe threshold is a predetermined distance from a center of a track on a disk of the at least one DSD;
receiving the environmental information from the at least one DSD;
determining whether the environmental information is within a threshold;
sending the write command to the at least one DSD if the environmental information is within the threshold; and
performing a precautionary measure if the environmental information is not within the threshold.

14. The method of claim 13, wherein performing the precautionary measure includes:
sending a test write command to the at least one DSD, wherein the test write command causes the at least one DSD to write test data on a disk of the at least one DSD; and
receiving from the at least one DSD an indication of whether the test data was successfully written on the disk.

15. The method of claim 13, wherein performing the precautionary measure includes delaying the sending of the write command.

16. The method of claim 13, wherein performing the precautionary measure includes sending an additional request for environmental information to a second DSD of the at least one DSD.

17. The method of claim 13, wherein preforming the precautionary measure includes redirecting the write command to a second DSD of the at least one DSD.

18. The method of claim 13, wherein the environmental condition includes at least one of a vibration condition of the at least one DSD and a mechanical shock condition of the at least one DSD.

19. The method of claim 13, further comprising assigning a write safety level from at least three write safety levels to the at least one DSD based on the received environmental information, the at least three write safety levels corresponding to relative likelihoods of encountering an error when storing data in the at least one DSD due to the environmental condition.

20. The method of claim 13, further comprising:
monitoring a performance of the at least one DSD in performing a previous write command; and
sending the request to the at least one DSD based on the monitored performance of the at least one DSD.

21. The method of claim 13, further comprising:
receiving an indication of an error in storing data to a memory of the at least one DSD; and
sending the request to the at least one DSD based on the received indication of the error.

22. The method of claim 13, wherein performing the precautionary measure includes causing a change in the environmental condition of the at least one DSD.

23. The method of claim 13, further comprising:
activating the at least one DSD; and
sending the request to the at least one DSD based on the activation of the at least one DSD.

24. The method of claim 13, further comprising executing a file system for writing data in overlapping tracks on a disk of the at least one DSD, and wherein the at least one DSD includes at least one area of overlapping tracks on the disk.

25. A Data Storage Device (DSD) in communication with a host, the DSD comprising:
a disk for storing data;

a head for writing data on the disk; and a controller configured to:

receive a request from the host requesting environmental information indicating an environmental condition of the DSD in preparation for sending a write command to the DSD to store data in the DSD;

obtain the environmental information, wherein the environmental information is based on a number of times the at least one DSD has exceeded a write unsafe threshold within a predetermined period of time or an amount of time since the at least one DSD has exceeded the write unsafe threshold, and wherein the write unsafe threshold is a predetermined distance from a center of a track on the disk; and send the environmental information to the host.

26. The DSD of claim 25, wherein the DSD further comprises at least one sensor, and wherein the controller is further configured to obtain additional environmental information from the at least one sensor.

27. The DSD of claim 26, wherein the at least one sensor includes at least one of a mechanical shock sensor, a vibration sensor, an accelerometer, a temperature sensor, a humidity sensor, and an air pressure sensor.

28. The DSD of claim 25, wherein the DSD further comprises a servo system for controlling the positioning of the head over the disk, and wherein the controller is further configured to obtain the environmental information from the servo system.

29. The DSD of claim 25, wherein the disk includes overlapping tracks for storing data.

30. A Data Storage Device (DSD) in communication with a host, the DSD comprising:

a disk for storing data, the disk including a reserved area for writing test data, and the reserved area including tracks at a different track pitch than tracks located elsewhere on the disk;

a head for writing data on the disk; and a controller configured to:

receive a test write command from the host to test an environmental condition of the DSD;

control the head to write test data in the reserved area in response to the test write command;

determine whether any errors occurred in writing the test data in the reserved area; and send an indication to the host of whether any errors occurred in writing the test data in the reserved area.

31. A host in communication with at least one Data Storage Device (DSD), the host comprising:

an interface for communicating with the at least one DSD; and a processor configured to:

send a request to the at least one DSD via the interface in preparation for sending a write command to the at least one DSD to store data in the at least one DSD, wherein the request is for environmental information indicating an environmental condition of the at least one DSD;

receive the environmental information from the at least one DSD via the interface;

determine whether the environmental information is within a threshold;

send the write command to the at least one DSD via the interface if the environmental information is within the threshold; and perform a precautionary measure including redirecting the write command to a second DSD of the at least one DSD if the environmental information is not within the threshold.

32. A method of preparing to send a write command to at least one Data Storage Device (DSD) to store data in the at least one DSD, the method comprising:

sending a request to the at least one DSD to request environmental information indicating an environmental condition of the at least one DSD;

receiving the environmental information from the at least one DSD;

determining whether the environmental information is within a threshold;

sending the write command to the at least one DSD if the environmental information is within the threshold; and performing a precautionary measure including redirecting the write command to a second DSD of the at least one DSD if the environmental information is not within the threshold.

* * * * *